(12) United States Patent
Lee et al.

(10) Patent No.: US 7,756,234 B2
(45) Date of Patent: Jul. 13, 2010

(54) METHOD OF AND SYSTEM FOR CONTROLLING FRAME SYNCHRONIZATION FOR EUROPEAN DIGITAL AUDIO BROADCASTING

(75) Inventors: Jeong-taek Lee, Seoul (KR); Shi-Chang Rho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 744 days.

(21) Appl. No.: 11/357,171

(22) Filed: Feb. 21, 2006

(65) Prior Publication Data

US 2006/0188049 A1    Aug. 24, 2006

(30) Foreign Application Priority Data

Feb. 21, 2005    (KR) .................. 10-2005-0014196

(51) Int. Cl.
*H04L 25/38* (2006.01)
*H04L 7/04* (2006.01)
(52) U.S. Cl. ....................... 375/369; 375/362
(58) Field of Classification Search ............... 375/369, 375/362, 354; 714/12; 327/141
See application file for complete search history.

(56) References Cited

U.S. PATENT DOCUMENTS 5,969,553 A * 10/1999 Kishi et al. .............. 327/159

2002/0186754 A1 * 12/2002 Kawai .................. 375/147

FOREIGN PATENT DOCUMENTS

| EP | 0 901 260 A | 3/1999 |
| KR | 2003-0006016 A | 1/2003 |
| KR | 10-2005-0063155 A | 6/2005 |

OTHER PUBLICATIONS

Chorng-Ren Sheu et al., "Joint symbol, frame, and carrier synchronization for Eureka 147 DAB system", IEEE 6$^{TH}$. International Conference on Universal Personal Communications Record, vol. 2 Conf. 6, Oct. 12, 1997, pp. 693-697, XP010248797.

* cited by examiner

*Primary Examiner*—David C Payne
*Assistant Examiner*—Brian J Stevens
(74) *Attorney, Agent, or Firm*—Sughrue Mion, PLLC

(57) ABSTRACT

Disclosed are a method of and a system for controlling frame synchronization for European Digital Audio Broadcast (DAB), the method including the steps of generating a frame synchronization start-signal with respect to an incoming signal which is input when power is supplied, keeping symbol count values with the value "0" after the frame synchronization start-signal is input, transmitting a frame offset value with respect to the incoming signal, and restarting symbol counting for frame synchronization depending on the frame offset value after the frame offset value is input, wherein the frame synchronization unit may preferably transmit the frame offset value after estimating the frame offset value. In accordance with the method and system described herein, it is possible to achieve frame synchronization in short time, thereby reducing a startup time of a DAB receiver and power consumption which is needed for the frame synchronization.

8 Claims, 7 Drawing Sheets

METHOD OF AND SYSTEM FOR CONTROLLING FRAME SYNCHRONIZATION FOR EUROPEAN DIGITAL AUDIO BROADCASTING

This application claims benefit under 35 U.S.C. §119 from Korean Patent Application No. 2005-14196, filed on Feb. 21, 2005, the entire content of which is incorporated herein by reference.

BACKGROUND OF THE INVENTION

1. Field of the Invention:

The present invention relates to a method of and a system for controlling frame synchronization, and more particularly to a method of and a system for controlling frame synchronization for European Digital Audio Broadcasting (DAB), which are capable of quickly controlling frame synchronization.

2. Description of the Related Art

DAB is an audio broadcasting service capable of transmitting characters, graphic images, and motion pictures as well as high quality audio and voice sound such as audio compact disc (CD) sound beyond typical audio sound such as AM and FM. The DAB provides a terrestrial broadcasting, which is offered for free in a local area, and a satellite DAB, which usually provides pay-for-use multimedia broadcasting service and is widely provided using both satellites and terrestrial networks. The DAB using ground waves has already been generally provided as a service in Europe and the United States of America (U.S.). For the standard of the DAB, the U.S. adopts an In Band on Channel scheme but Europe adopts Eureka 147 which is an Out of Band scheme. In Europe, the DAB started to be developed in 1987 and the European Standard for the DAB has been established since 1995 since the United Kingdom launched the service in 1995. Further, the DAB service is now being provided in France, Germany and Sweden.

Contrasting the European scheme with the U.S. scheme, the DAB in the U.S. uses both of analog broadcasting and digital broadcasting by converting the analog broadcasting to digital broadcasting. Meanwhile, the DAB in Europe is a new concept of service where new service providers and existing service providers enter the market together. Korea established the Eureka 147 of Europe as its national standard, and launched the terrestrial DAB service over the metropolitan area starting in 2004. In order to enable European DAB receivers to operate normally, at least synchronization should be performed. Synchronization of the European DAB receivers is carried out by performing frame synchronization, frequency synchronization and symbol synchronization, in turn.

Figure 1:
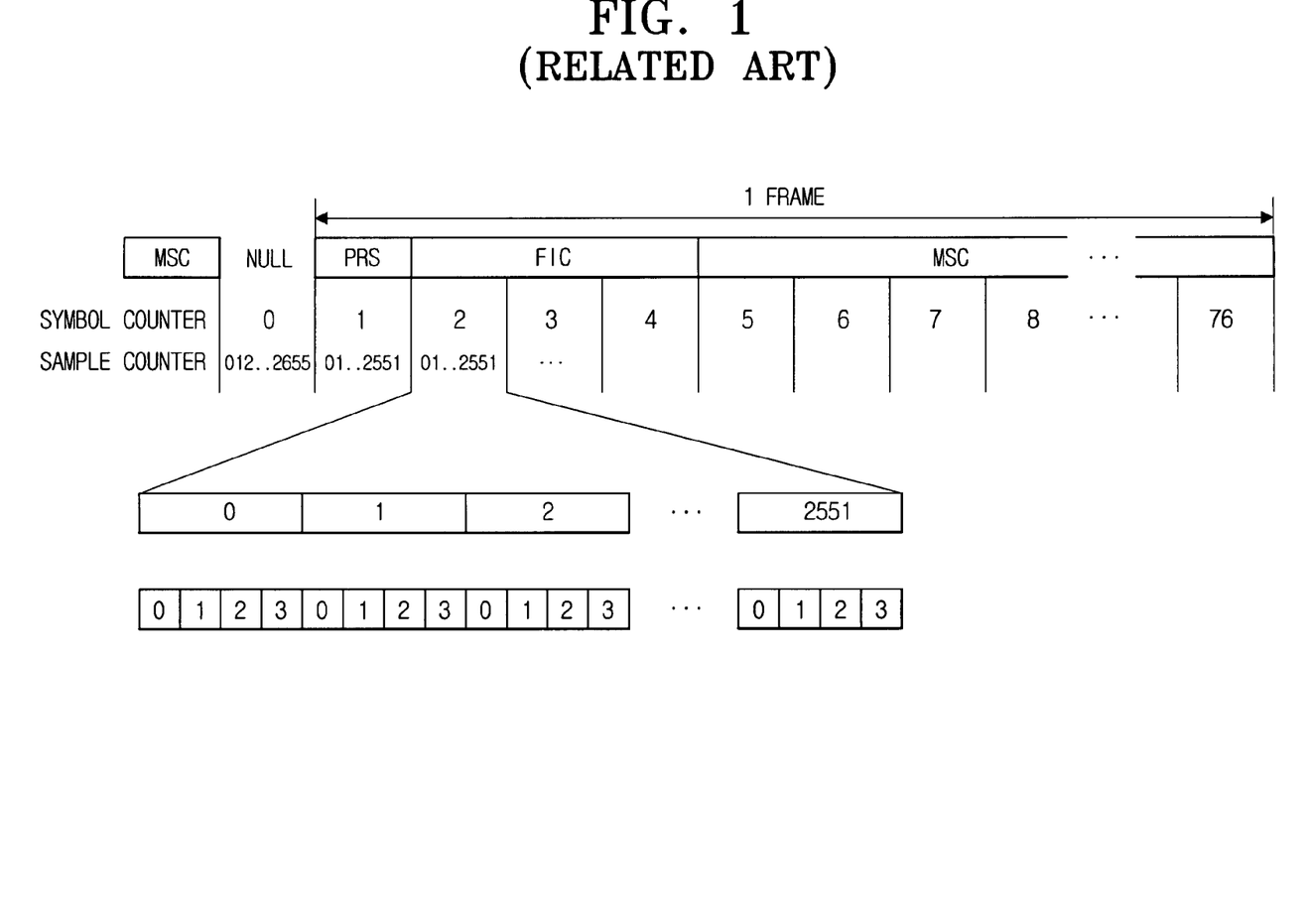
FIG. 1 illustrates a composition of a frame.

FIG. 1 illustrates a composition of a frame. A frame is comprised of a set of symbols, 0 to 76. Orthogonal frequency division multiplexing (OFDM) symbols constitute a DAB frame and the maximum value thereof changes depending on the mode of a symbol counter and a null symbol always has a value zero. Meanwhile, each OFDM symbol includes a set of samples, 0 to 2551.

To implement the frame synchronization, first, a beginning point of a DAB frame should be looked for. The frame synchronization comprises a frame offset search period for estimating a frame offset value and a frame offset compensation period for applying the estimated frame offset value. Generally, the search period is longer than a time corresponding to the sum of an interval of at least one frame and an interval of the null symbols. For the search period, a power-moving average scheme typically using two windows is applied.

Figure 2:
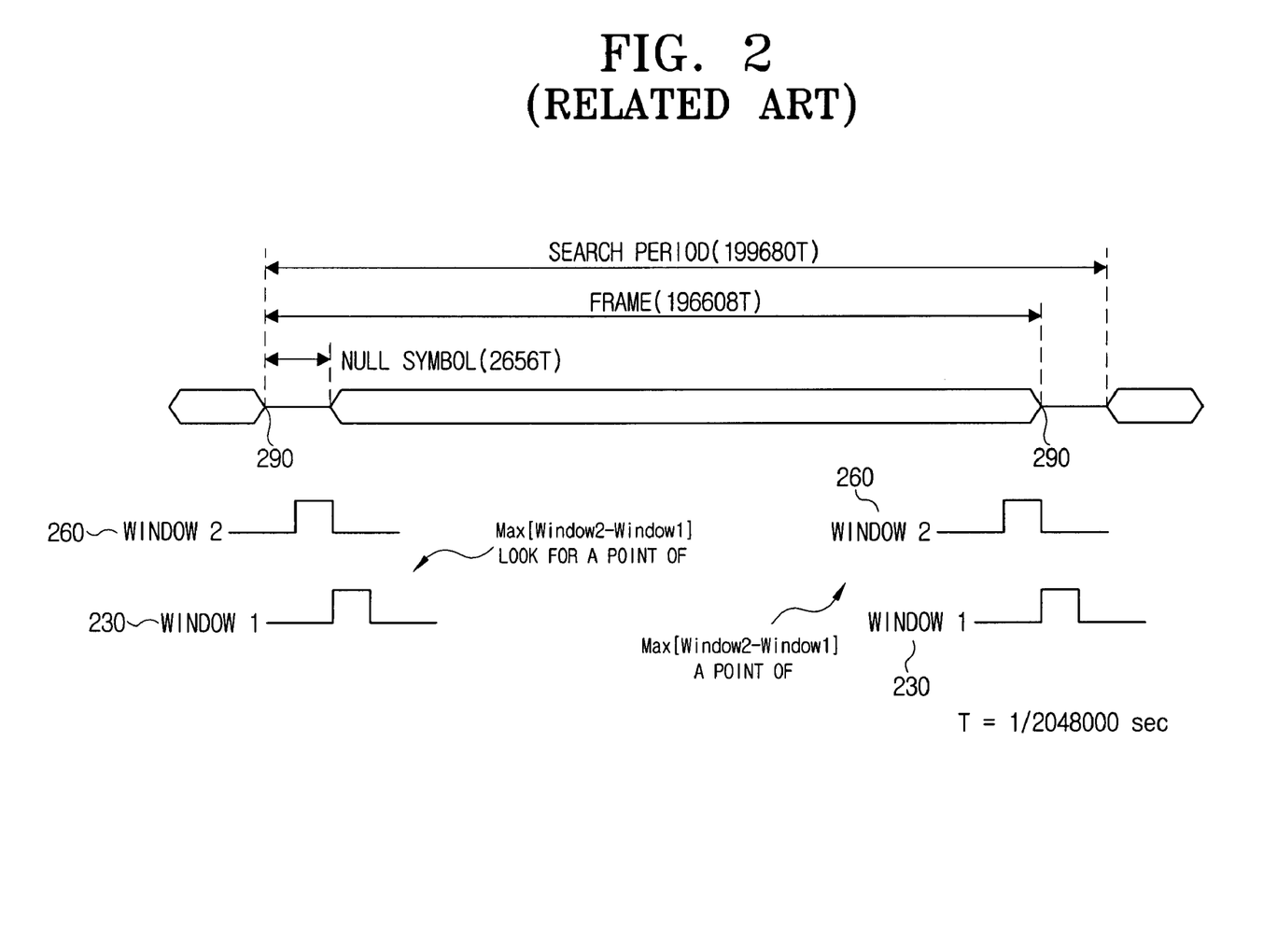
FIG. 2 illustrates a conceptual diagram explaining the power-moving average scheme.

FIG. 2 is a conceptual diagram of the power-moving average scheme. The scheme is based on a time and is a method for searching an interval of one or more frames using two windows 230, 260 with the length L. For each sample, a beginning point 290 of a frame is determined at a point having the maximum energy ratio of the two windows 230, 260. Equation 1 expresses the method of searching the beginning point 290 in the power-moving average scheme.

$$Frame_{\text{start\_point}} = \text{MAX}_i \frac{\text{energy}(window2(i))}{\text{energy}(window1(i))} - L \quad \text{Equation 1}$$

Figure 3:
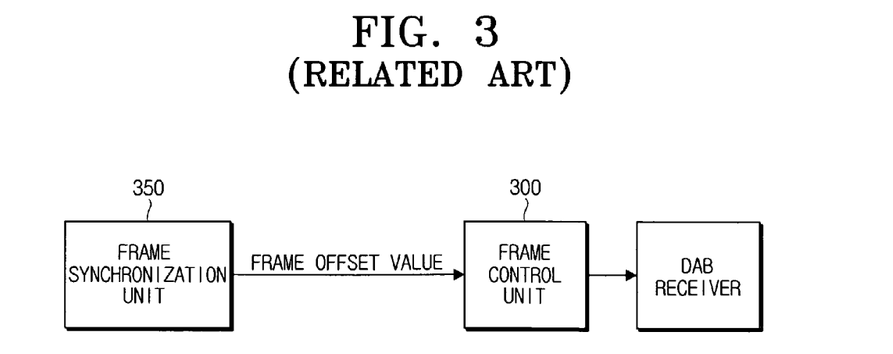
FIG. 3 illustrates a constitution of a frame control system.

FIG. 3 illustrates a constitution of a frame control system. A DAB receiver should have at least a frame control unit 300 and a frame synchronization unit 350 for its normal operation. The frame control unit 300 is an important controlling part for the receiver, and operates by being synchronized with a transmitted DAB frame signal after receiving a frame offset and a symbol offset. Each block in the receiver performs its own function by receiving control signals from the frame control unit 300. The frame synchronization unit 350 estimates a frame offset value during the frame offset search period described above and inputs the frame offset value to the frame control unit 300. That is, the frame control unit 300 operates by receiving the frame offset value and the control signals from the frame synchronization unit 350. Here, the frame control unit 300 and the frame synchronization unit 350 operate independently and the frame offset value is updated by a frame.

Figure 4:
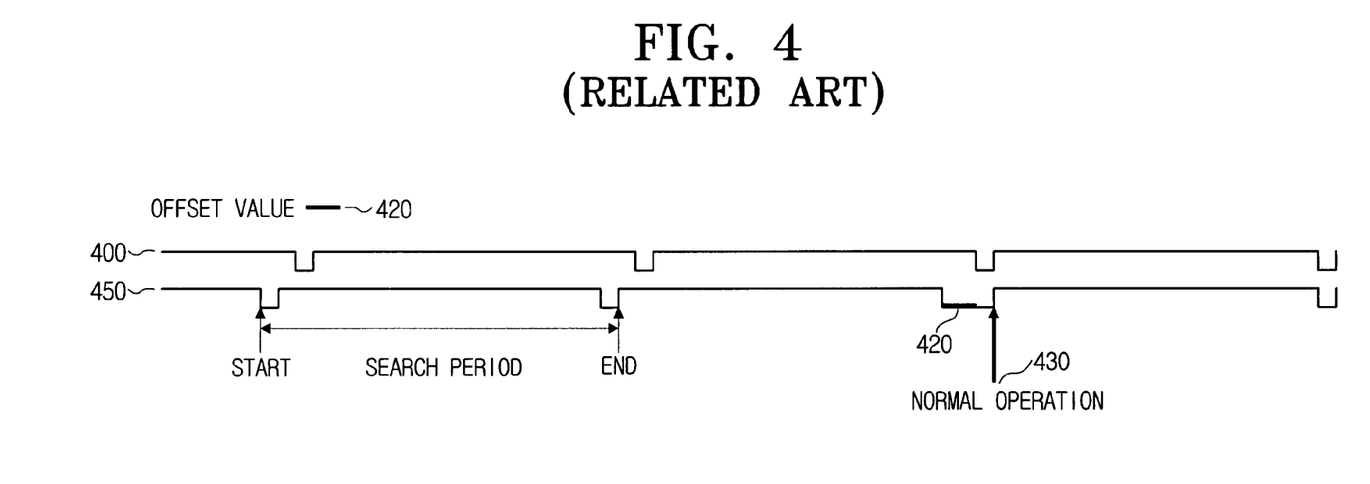
FIG. 4 illustrates a method of controlling frame synchronization in accordance with a related art.

FIG. 4 illustrates a method of controlling frame synchronization in accordance with a related art. A method of controlling the frame synchronization in accordance with a related art will be described below with reference to FIG. 3 and FIG. 4. When a power is applied to the DAB receiver, the frame control unit 300 starts symbol counting. With reference to FIG. 4, reference numeral 450 denotes a symbol counting clock signal, pulses of the symbol counting clock signal 450 are not coincident with pulses of an external clock signal 400, so that the frame synchronization is needed. Meanwhile, the frame synchronization unit 350 estimates a frame offset value 420 during the search period 410. The frame synchronization unit 350 inputs the estimated offset value 420 into the frame control unit 300, and the frame control unit 300 counts up the null symbols as many as the number of times which correspond to the offset value 420 when counting the null symbols during a symbol counting period. As a result, the DAB receiver can normally operate.

However, in the method in accordance with the related art referenced in FIG. 4, there occurs a delay time corresponding to 3 frames (average 2.5 frames) between estimation of the frame offset value and application of the estimated frame offset value. That is why the frame synchronization unit 350 and the frame control unit 300 operate independently. That is, the delay time corresponding to at least one frame occurs after estimating the offset value. This affects the startup time of a receiver, thereby increasing the total startup time and delaying operations of under-layer logic elements.

SUMMARY OF THE INVENTION

The present invention has been developed in order to address the above and other problems associated with the related art. One aspect of the present invention is to provide a method of and a system for controlling frame synchronization, which are capable of controlling frame synchronization in a shorter control time in comparison with related methods. In an exemplary embodiment of the present invention, there is provided a method of controlling frame synchronization, which includes the steps of generating a frame synchronization start-signal with respect to an incoming signal which is input when power is supplied, keeping a symbol count value with the value "0" since the frame synchronization start-signal was input, generating a frame offset value with respect to the incoming signal, and restarting symbol counting for the frame synchronization depending on the frame offset value after the frame offset value is input.

According to an exemplary embodiment, in the step of inputting the frame offset value, the frame offset value is transmitted to the frame control unit after the frame offset value is estimated. The estimation of the frame offset value may be performed while the frame control unit keeps the symbol count value with the value "0."

According to another exemplary embodiment, the estimation of the frame offset value may be performed throughout a time period corresponding to one or more frames. Preferably, the frame control unit restarts the symbol counting after a lapse of time period corresponding to the sum of a time for estimating the frame offset value and a time corresponding to the frame offset value in the step of restarting the symbol counting depending on the frame offset value.

In accordance with another aspect of this invention, there is provided a system for controlling frame synchronization, comprising a frame synchronization unit for generating a frame synchronization start-signal with respect to an incoming signal which is input when power is supplied and a frame offset value with respect to the incoming signal, and a control unit for keeping a symbol counting value with the value "0" after receiving the frame synchronization start-signal, and restarting symbol counting operation depending on the frame offset value after receiving the frame offset value from the frame synchronization unit.

The frame synchronization unit may generate the frame offset value after estimating the frame offset value. The estimation of the frame offset value may be performed while the frame control unit keeps the symbol count value with the value "0."

The estimation may be performed throughout a time period corresponding to one or more frames. The frame control unit may restart the symbol counting operation after a lapse of a time corresponding to the sum of a time for estimating the frame offset value and a time corresponding to the frame offset value.

BRIEF DESCRIPTION OF THE DRAWINGS

The above aspects and features of the present invention will be more apparent by describing certain exemplary embodiments of the present invention with reference to the accompanying drawings, in which.

DETAILED DESCRIPTION OF THE EXEMPLARY EMBODIMENTS

Certain exemplary embodiments of the present invention will be described in greater detail with reference to the accompanying drawings.

Figure 5:
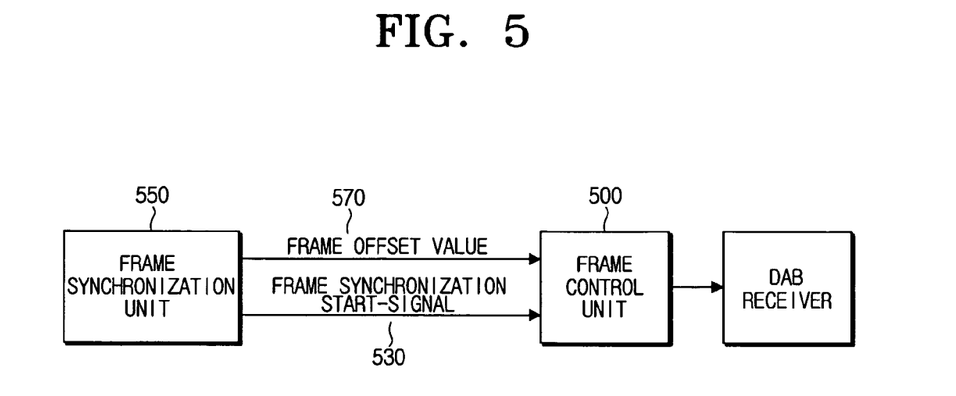
FIG. 5 illustrates a constitution of frame synchronization system in accordance with the present invention.

FIG. 5 illustrates a constitution of a frame synchronization system in accordance with the present invention. With reference to FIG. 5, a frame synchronization system includes a frame synchronization unit 550 and a frame control unit 500. The frame synchronization unit 550 inputs a frame synchronization start-signal 530 and a frame offset value 570 into the frame control unit 500. The frame control unit 500 receives the frame synchronization start-signal 530 from the frame synchronization unit 550 and then keeps the symbol count value constant, i.e. the value "0," and then restarts symbol counting depending on the frame offset value 570 after receiving the frame offset value 570.

Figure 6:
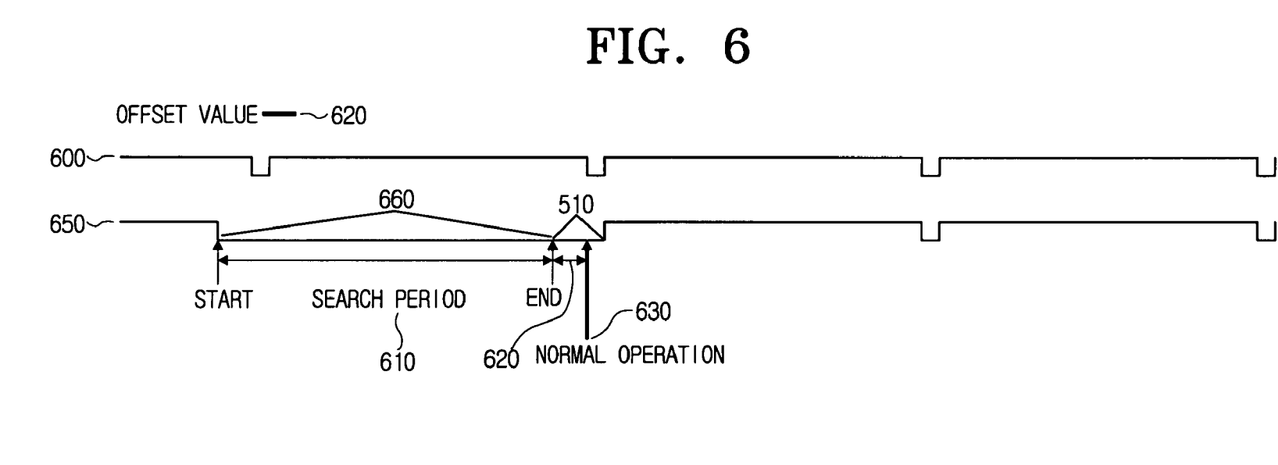
FIG. 6 illustrates a method of controlling frame synchronization in accordance with the present invention.

FIG. 6 illustrates an exemplary embodiment of a method of controlling frame synchronization in accordance with the present invention. A method of controlling frame synchronization in accordance with the present invention will be described below with reference to FIG. 5 and FIG. 6. When a power is supplied to the DAB receiver, the frame control unit 500 starts symbol counting in response to a symbol counting signal 650. As shown in FIG. 6, a beginning pulse of the symbol counting signal 650 is not coincident with a beginning pulse of an external signal 600, an incoming signal, so that frame synchronization is needed. Meanwhile, the frame synchronization unit 550 inputs a frame synchronization signal 530 to the frame control unit 500 and at the same time estimates the frame offset value 620 during a search period 610. The frame control unit 500 keeps the symbol count value constant, i.e. the value "0" after receiving the frame synchronization start-signal 530. After that, the DAB receiver starts normal operation 630.

In accordance with the present invention, there occurs a delay time ranging from at least one frame to at most two frames (average 1.5 frames) between estimation of the frame offset value and application of the estimated value. That is, it is possible to decrease the delay time by a time corresponding to one frame in comparison with the method in accordance with the related art. As a result, startup of the receiver can be faster, the total startup time is reduced and constitution of under-layer logic elements can be simplified.

Figure 7:
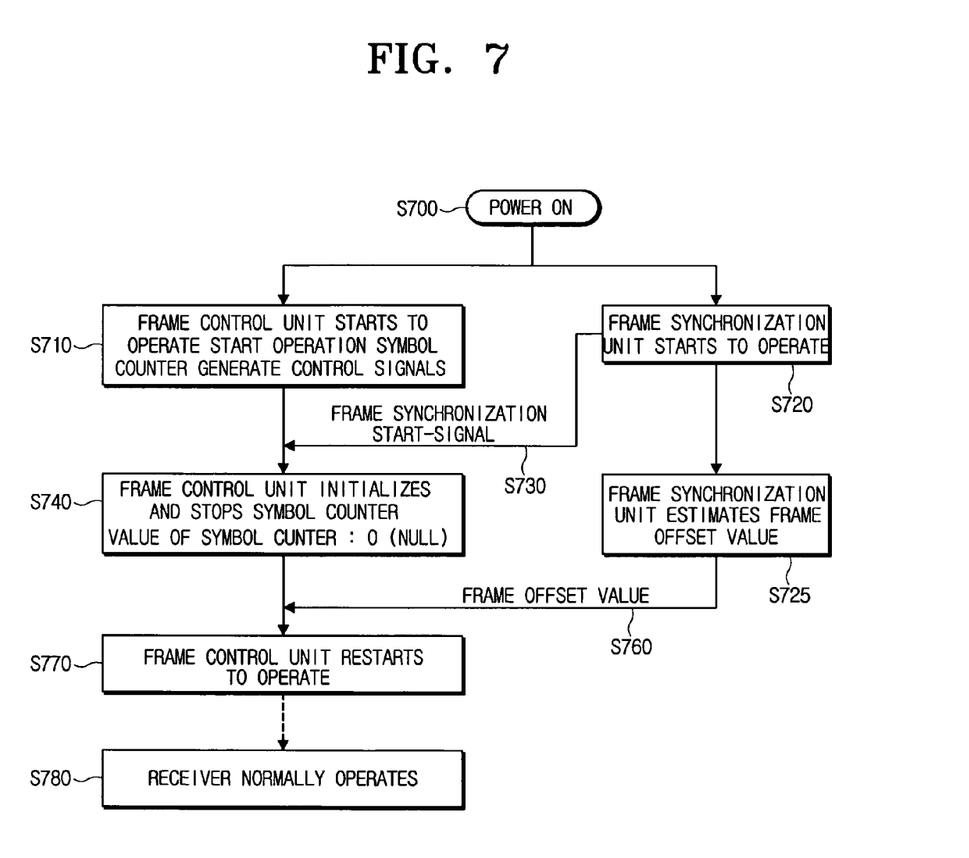
FIG. 7 is a flow chart showing a method of controlling frame synchronization in accordance with the present invention.

FIG. 7 illustrates a flow chart showing a method of controlling frame synchronization in accordance with the present invention. With reference to FIG. 7, first power is supplied to a DAB receiver (S700). Next, a frame control unit starts a symbol counter to count symbols, and operates to generate control signals (S710). A frame synchronization start-signal is input to the frame control unit (S730). After the frame control unit receives the frame synchronization start-signal, it initializes the value of the symbol counter and stops the symbol counter to count the symbols, so that the value of the symbol counter is kept null, i.e. the value "0" (S740). The frame synchronization unit inputs the frame synchronization start-signal to the frame control unit (S730), and then estimates a frame offset value (S750). In case that the estimated frame offset value is input to the frame control unit (S760), the frame control unit holds "0" as the value of the symbol counter for a time corresponding to the frame offset value, and then restarts the operation of the symbol counter (S780).

As described above, in accordance with exemplary embodiments of the present invention, it is possible to achieve frame synchronization in short time for a DAB receiver. As a result, a startup of the DAB receiver becomes faster, thereby reducing power consumption which is needed for the frame synchronization.

The foregoing embodiments and advantages are merely exemplary and are not to be construed as limiting the present invention. The present teaching can be readily applied to other types of embodiments. Also, the description of the exemplary embodiments of the present invention is intended to be illustrative, and not to limit the scope of the claims, and many alternatives, modifications, and variations will be apparent to those skilled in the art.

What is claimed is:

1. A method of controlling frame synchronization comprising:
   generating by a frame synchronization unit, a frame synchronization start-signal with respect to an incoming signal which is input when power is supplied;
   keeping symbol count values with the value "0" after receiving the frame synchronization start-signal;
   generating a frame offset value with respect to the incoming signal; and
   restarting symbol counting for frame synchronization depending on the frame offset value after the frame offset value is input,
   wherein the symbol count values are additionally being kept with the value "0" for a period corresponding to the input frame offset values,
   wherein the restarting of the symbol counting is performed upon lapse of a time period corresponding to the sum of a time for estimating the frame offset value and a time corresponding to the frame offset value in the step of restarting the symbol counting depending on the frame offset value.

2. The method according to claim 1, wherein the inputting the frame offset value transmits the frame offset value to a frame control unit after estimating the frame offset value.

3. The method according to claim 2, wherein estimation of the frame offset value is performed while the frame control unit keeps the symbol count values with the value "0".

4. The method according to claim 3, wherein the estimation of the frame offset value is performed for a period corresponding to at least one frame.

5. A system for controlling frame synchronization, comprising:
   a frame synchronization unit which generates a frame synchronization start-signal with respect to an incoming signal which is input when power is supplied and which generates a frame offset value with respect to the incoming signal; and
   a control unit which keeps symbol counting values with the value "0" after receiving the frame synchronization start-signal, and which restarts symbol counting operation depending on the frame offset value after receiving the frame offset value from the frame synchronization unit,
   wherein the control unit additionally keeps the symbol count values with the value "0" for a period corresponding to the input frame offset value,
   wherein the control unit restarts the symbol counting operation upon lapse of a time period corresponding to the sum of a time for estimating the frame offset value and a time corresponding to the frame offset value in the restarting of the symbol counting operation depending on the frame offset value.

6. The system according to claim 5, wherein the frame synchronization unit transmits the frame offset value after estimating the frame offset value.

7. The system according to claim 6, wherein estimation of the frame offset value is performed while the frame control unit keeps the symbol count values with the value "0".

8. The system according to claim 7, wherein the estimation is performed throughout a time period corresponding to at least one frame.

* * * * *